Figure 1:
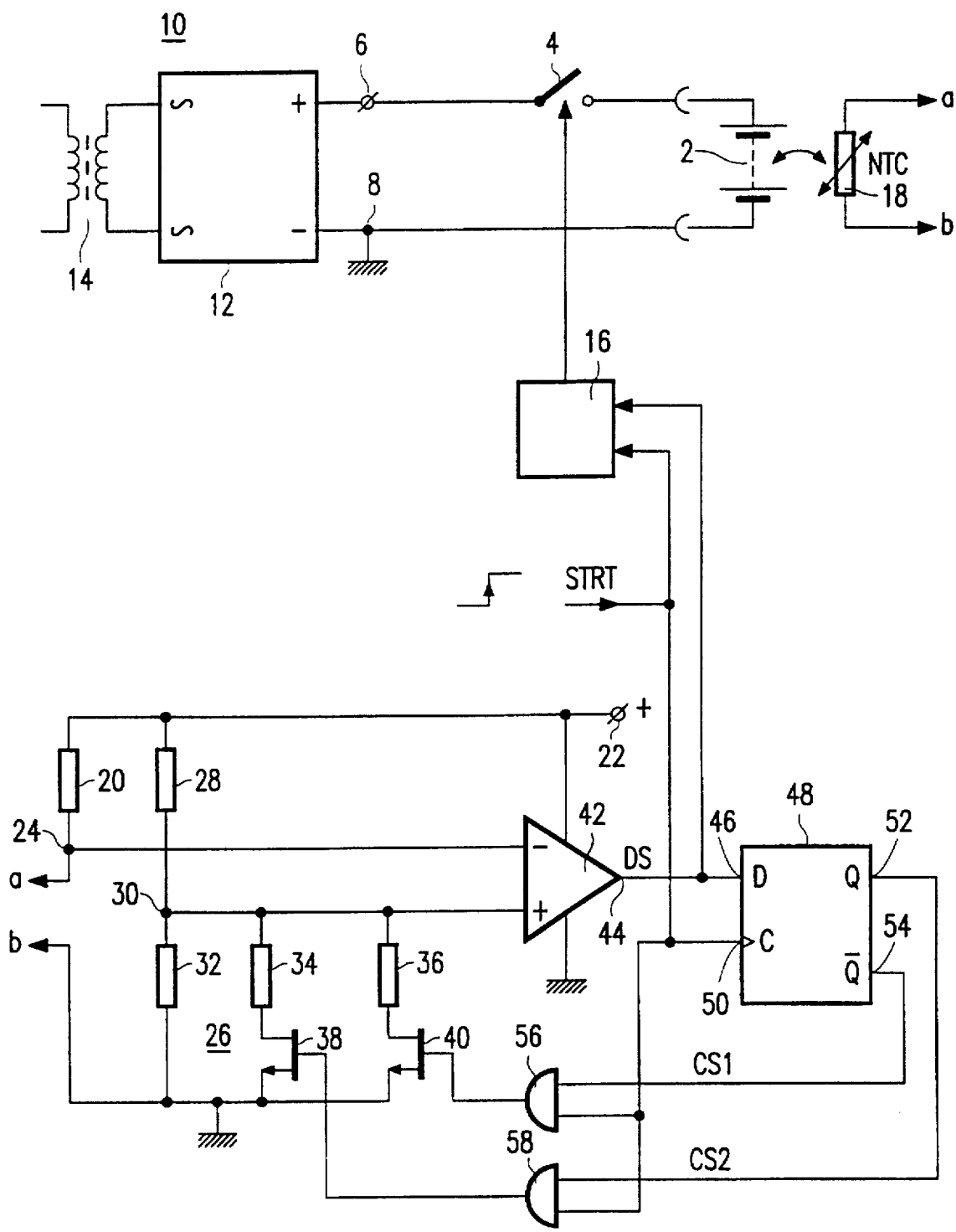

United States Patent
Bisschop et al.

[11] Patent Number: 5,604,419
[45] Date of Patent: Feb. 18, 1997

[54] CHARGING DEVICE FOR CHARGING RECHARGEABLE BATTERIES WITH TEMPERATURE-DEPENDENT TERMINATION OF THE CHARGING PROCESS

[75] Inventors: Oedilius J. Bisschop, Drachten; Johann R. G. C. M. Van Beek, Eindhoven; Eduard E. A. Gillissen, Eindhoven; Martinus H. Van Maaren, Eindhoven, all of Netherlands

[73] Assignee: U.S. Philips Corporation, NY, N.Y.

[21] Appl. No.: 444,137

[22] Filed: May 18, 1995

[30] Foreign Application Priority Data

May 19, 1994 [EP] European Pat. Off. ............ 94201417

[51] Int. Cl.$^6$ ........................................... H02J 7/04
[52] U.S. Cl. ....................................... 320/35; 320/2
[58] Field of Search .................. 320/35, 2; 33/DIG. 13; 73/766; 338/2

[56] References Cited

U.S. PATENT DOCUMENTS 4,816,737  3/1989  Delmas et al. .................... 320/35
5,260,638  11/1993  Hirahara ........................... 320/46

Primary Examiner—Peter S. Wong
Assistant Examiner—Patrick B. Law
Attorney, Agent, or Firm—Arthur G. Schaier

[57] ABSTRACT

A charging device for charging a rechargeable battery including a current supplier for supplying charging current to a battery having an initial temperature at the beginning of the supply of charging current, a selector for selecting an end temperature based on a temperature range the initial temperature is in and a current terminator for terminating the supply of charging current when a battery reaches the end temperature. A rechargeable battery including a strain gauge having a temperature coefficient differing from a temperature coefficient of the battery housing is also provided.

20 Claims, 2 Drawing Sheets

CHARGING DEVICE FOR CHARGING RECHARGEABLE BATTERIES WITH TEMPERATURE-DEPENDENT TERMINATION OF THE CHARGING PROCESS

The invention relates to a charging device for charging a rechargeable battery, comprising: first means for the supply of charging current to the battery, second means for terminating the supply of charging current when the battery reaches an end temperature which is higher than an initial temperature of the battery at the beginning of the supply of charging current.

Such a charging device is known from, inter alia, U.S. Pat. No. 4,816,737. When rechargeable batteries such as NiCd (nickel-cadmium) and NiMH (nickel-metal-hydride) batteries are charged the temperature of the battery increases rapidly at the end of the charging process. When charging is not terminated in due time the battery may be damaged and its life span will be reduced. Therefore, it is important to stop the charging process when the battery temperature exceeds a certain limit. In the known charging device the increase in battery temperature is determined by measuring the difference between the battery temperature and the ambient temperature. Such a differential measurement requires two temperature sensors, one for measuring the ambient temperature and the other for measuring the battery temperature. The sensor for measuring the ambient temperature can be dispensed with in that the initial temperature of the battery is measured when charging begins and is stored in a memory. Subsequently, the battery temperature is continually measured and compared with the stored initial temperature. Charging is terminated once the difference between the instantaneous temperature and the stored initial temperature exceeds a given threshold. This type of measurement requires only one temperature sensor, which is advantageous for the mechanical construction, but storing the initial temperature is feasible only by means of a digital memory and an analog-to-digital converter. The analog-to-digital converter then constantly converts the instantaneous temperature value into a digital instantaneous-temperature signal, which is compared digitally with the stored initial temperature. However, the analog-to-digital converter and the digital signal processing are comparatively intricate and make the charging device unnecessarily expensive for many uses.

Therefore, it is an object of the invention to provide a charging device for rechargeable batteries, by means of which overcharging at excessive temperatures can be precluded in a simple manner. To achieve this, according to the invention, the charging device of the type defined in the opening paragraph is characterised in that the charging device further comprises third means for determining in which temperature range of a plurality of at least two given temperature ranges the initial temperature lies and for selecting the end temperature in dependence upon the instantaneous temperature range thus determined.

The charging device in accordance with the invention merely determines in which temperature range the temperature of the battery to be charged lies when charging begins. Once this has been determined, a corresponding end temperature at which charging is to be terminated is selected. This does not require a continuous temperature measurement with an analog-to-digital converter but merely a detection whether the selected end temperature is reached.

In the simplest version the number of temperature ranges is two, in which case a measurement is effected to determine whether the battery temperature when charging begins is above or below a given temperature, for example 15° C. If the temperature is found to be below 15° C. a comparatively low end temperature, for example 40° C., is selected. In the other case a comparatively high end temperature, for example 60° C., is selected. It will be obvious that a larger number of temperature ranges can be distinguished and chosen with a corresponding number of end temperatures. The values of the corresponding end temperatures depend on the type of battery and follows from the technical data and specifications of the relevant rechargeable battery.

An embodiment of the charging device in accordance with the invention is characterised in that the third means include:

fourth means for generating a temperature-dependent signal, fifth means for generating at least one reference signal to define the at least two given temperature ranges, sixth means for comparing the temperature-dependent signal with the at least one reference signal and to supply, when the supply of charging current begins, a decision signal to indicate the instantaneous temperature range, and seventh means for changing, after the supply of charging current has begun, the at least one reference signal in response to the decision signal.

In this embodiment a signal which is a measure of the battery temperature when charging begins is compared with a reference signal. The result of this comparison yields the temperature range in which the initial temperature lies. Subsequently, on the basis of the result, the value of the reference signal is changed to a new value which is a measure of the selected end temperature. Charging of the battery is discontinued when the value of the signal which is a measure of the battery temperature is equal to the changed reference signal.

The means for generating a temperature-dependent signal can be implemented in various ways. For this purpose an embodiment of the charging device in accordance with the invention is characterised in that the fourth means comprise a temperature-sensitive resistor which is thermally coupled to the battery. For the same purpose another embodiment is characterised in that the fourth means comprise a strain gauge which is mechanically coupled to a housing of the battery, the temperature coefficient of the strain gauge differing from the temperature coefficient of the housing of the battery.

A very simple embodiment having two temperature ranges is characterised in that the third means include:

a first voltage divider comprising a first resistor and a temperature-sensitive resistor, the first resistor and the temperature-sensitive resistor being interconnected in a first node, a second voltage divider comprising a second resistor and a reference resistor whose resistance value is variable in steps in response to the decision signal, the second resistor and the reference resistor being interconnected in a second node, a comparator having inputs connected to the first and the second node and having an output for supplying the decision signal.

The two voltage dividers form a resistance bridge where the point of equilibrium in the voltage between the taps is dependent on the temperature owing to the temperature-sensitive resistor and is variable by means of the variable reference resistor. When charging begins the comparator compares the resistance value of the temperature resistor with the resistance value of the reference resistor. After charging has started the binary output signal of the comparator determines which of two new reference resistance values is to be selected.

This embodiment may be characterised further in that the temperature sensitive resistor has a negative temperature coefficient, in that the reference resistor comprises the parallel arrangement of a fixed resistor and two parallel resistors which can be arranged in parallel with this fixed resistor by means of respective switching transistors, and in that the charging device further comprises eighth means for turning on one of the respective switching transistors after the beginning of the supply of charging current.

The resistance value of a resistor with a negative temperature coefficient (NTC) decreases as the temperature increases. The point of equilibrium of the bridge at a higher temperature is reached for a smaller value of the reference resistor. The smaller value is obtained by arranging a resistor in parallel with the reference resistor. The value of the parallel resistor is determined by the resistance reduction of the NTC resistor at the selected end temperature.

The embodiment may be characterised further in that the eighth means comprise: a flip-flop having a data input, which is coupled to the output of the comparator to receive the decision signal, having a clock input for receiving a start signal, and having two complementary outputs for supplying complementary control signals, and gate circuits for transferring the complementary control signals to the respective switching transistors under command of the start signal.

The flip-flop latches the state of the decision signal upon receipt of the starting signal indicating the start of the charging process. Depending on this state one of the switching transistors is turned on and the appropriate resistor is connected in parallel with the fixed reference resistor. The gate circuits block the control signals as long as charging has not been started and thereby inhibit a measurement of the initial temperature. This is because neither of the switching transistors should then be driven.

Figure 2:
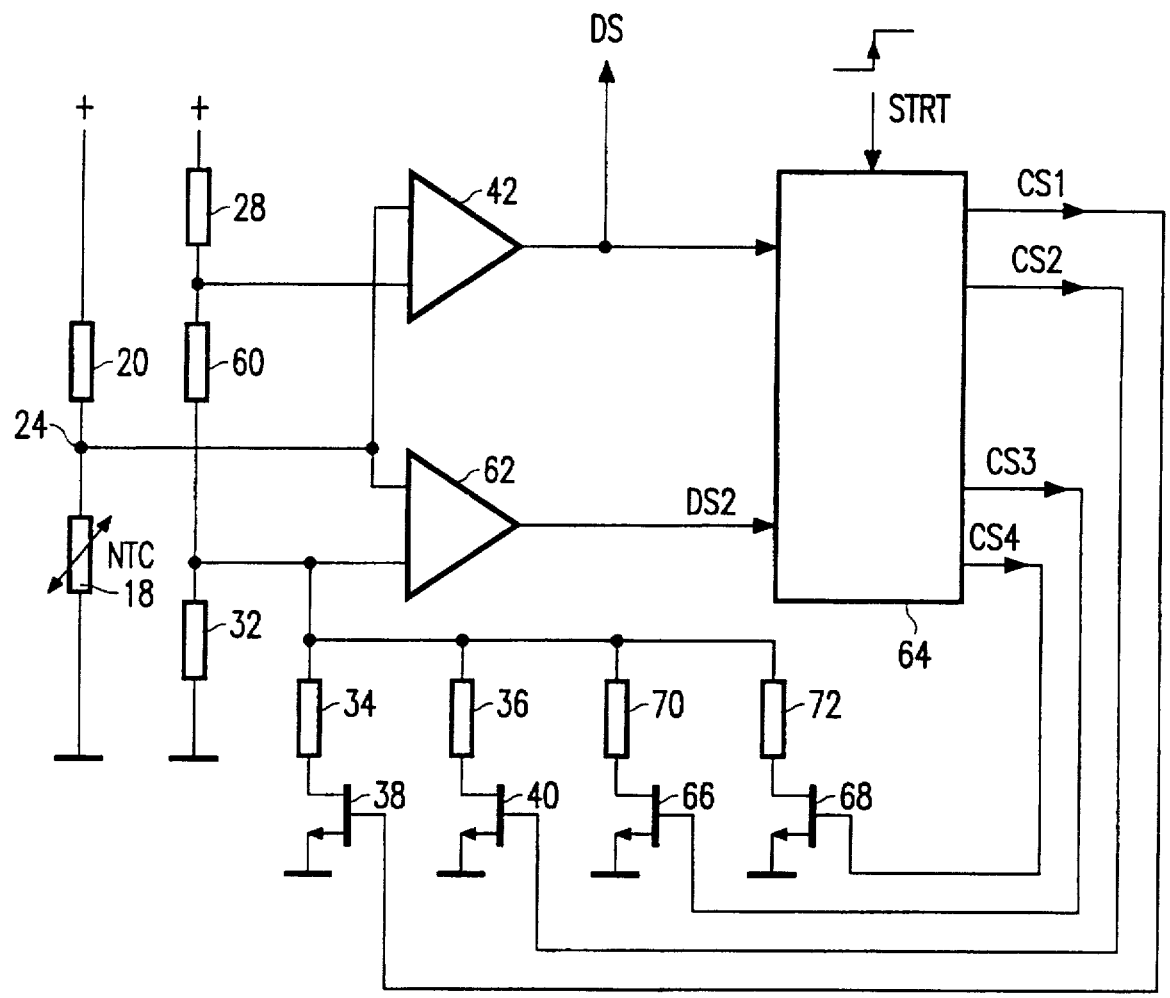
Figure 3:
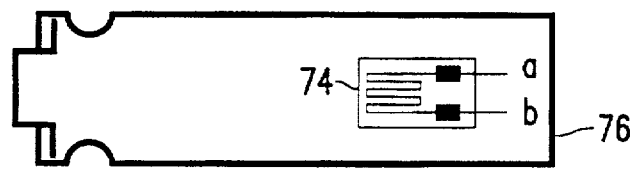

These and other aspects of the invention will now be described and elucidated with reference to the accompanying drawings, in which FIG. 1 shows a circuit diagram of an embodiment of a charging device in accordance with the invention, FIG. 2 shows a circuit diagram of an alternative embodiment of a charging device in accordance with the invention, and FIG. 3 shows a battery with a strain-gauge for use on a charging device in accordance with the invention.

In these Figures like elements bear the same reference numerals.

FIG. 1 shows a circuit diagram of an embodiment of a charging device in accordance with the invention. A rechargeable battery 2 is connected, via a switch 4, to a positive supply terminal 6 and to a negative supply terminal 8 of a d.c. supply 10, which negative supply terminal is considered to be connected to earth. The d.c. supply 10 comprises, by way of example, a rectifier bridge 12 and a transformer 14, but any other power source supplying a suitable direct voltage may be used. The switch 4 is actuated via an interface circuit 16 having an input for receiving a start signal STRT, by means of which the switch 4 can be closed, and an input for receiving a signal DS, by means of which the switch 4 can be opened. The switch 4 can be a relay or a switching transistor. The interface circuit 16 can be a set-reset flip-flop with associated electronic devices for controlling the switch 4.

The temperature of the battery 2 is measured by means of a temperature-sensitive element 18 which is thermally coupled to the battery 2. The temperature-sensitive element 18 is, for example, a resistor with a negative temperature coefficient (NTC). Instead of this resistor it is, for example, also possible to choose, as is shown in FIG. 3, a strain gauge 74 on the jacket 76 of the battery 2, the strain gauge being deliberately selected to have a temperature coefficient unequal to the temperature coefficient of the battery jacket. In the case of a suitable choice the strain gauge then behaves as a temperature-sensitive resistor with a positive or negative temperature coefficient. Obviously, a rechargeable battery with such a strain gauge can also be used in conjunction with battery chargers which differ from those described herein but which also stop the charging process in response to a temperature-sensitive element which is thermally coupled to the battery.

The temperature-sensitive element 18 in series with a resistor 20 is arranged between earth and a positive supply terminal 22, which receives a positive supply voltage from the d.c. supply 10 or from another suitable supply voltage source. The resistor 20 and the temperature-sensitive element 18 are connected together in a node 24 and form a temperature-dependent voltage divider. A second voltage divider between earth and the positive supply terminal 22 comprises a reference resistor 26, whose resistance is variable in steps, and a resistor 28, which resistors are connected to one another in a node 30. In the present case the reference resistor 26 consists of a fixed resistor 32 and two parallel resistors 34 and 36, which can be arranged in parallel with the fixed resistor 32 by respective switching transistors 38 and 40. The nodes 24 and 30 are connected to inputs of a comparator 42 having an output 44, which supplies a decision signal DS, which is comparatively high if the voltage on the node 30 is larger than the voltage on the node 24 and which is comparatively low in the opposite case. The decision signal DS is applied to the data input 46 of a flip-flop 48 having a clock input 50 arranged to receive the start signal STRT and having an output 52 which takes over the value of the decision signal DS upon a positive-going edge of the start signal STRT. The signal CS1 from the output 52 functions as the control signal for switching over the switching transistor 40. The complementary output 54 of the flip-flop 48 supplies a complementary control signal CS2 for switching over the switching transistor 38. The complementary control signals CS1 and CS2 are applied to inputs of respective AND-gates 56 and 58 whose outputs are connected to the control electrodes of the switching transistors 40 and 38. The start signal STRT is applied to further inputs of the AND-gates 56 and 58, as a result of which tile switching transistors 38 and 40 are both in a non-conducting state when the start signal STRT is low.

When charging of the battery 2 begins the start signal STRT is low and the comparator compares the resistance value of the temperature-sensitive element 18 with the resistance value of the fixed resistor 32. The value of the fixed resistor corresponds to the resistance of the temperature-sensitive element 18 at a given temperature, for example 15° C. Thus, it is decided whether the initial temperature of the battery 2 is above or below 15° C. The decision signal DS from the comparator has a comparatively low value if the initial temperature is below 15° C. and a comparatively high value if the initial temperature is above 15° C. Upon a positive-going edge of the start signal STRT the switch 4 is closed and charging of the battery 2 is started. At the same time the instantaneous value of the decision value DS is latched by the flip-flop 48 and one of the switching transistors 38 and 40 is turned on via the AND-gates 56 and 58. As a result, one of the resistors 34 and 36 is arranged in parallel with the fixed resistor 32. This reduces the value of the reference resistor 26 to a new value corresponding to the desired end temperature at which the process of charging the battery 2 is to be stopped. If the initial temperature is below 15° C. an end temperature of, for example, 40° C. is selected and the resistor 36 is connected in parallel. If the initial temperature is above 15° C. an end temperature of, for example, 60° C. is selected and the resistor 34 is connected in parallel. The values of the resistors 34 and 36 are selected in such a manner that the parallel arrangement of the fixed resistor 32 and the resistor 34 or 36 corresponds to the resistance value at 60° C. and at 40° C., respectively, of the temperature-sensitive element 18 with a negative temperature coefficient. The temperature of the battery 2 will rise as the battery 2 is charged. When the selected end temperature is reached the value of the decision signal DS will rise from a comparatively low value to a comparatively high value. This signal rise is an indication to the interface circuit 16 that the switch 4 should be opened to discontinue charging of the battery 2. This prevents the battery from being damaged by overcharging or by too high temperatures, which is particularly important in the case of NiMH (Nickel Metal Hydride) batteries.

Instead of a temperature-sensitive element 18 with a negative temperature coefficient (NTC) it is possible to use an element with a positive temperature coefficient (PTC). In last-mentioned case the value of the reference resistor 26 should be increased in steps after the initial temperature has been determined. This can be achieved by replacing the AND-gates 56 and 58 by NAND-gates. One of the switching transistors 38 and 40 is then selectively turned off instead of turned on.

To determine the end temperature it has been assumed so far that there are two temperature ranges in determining the initial temperature. The number of temperature ranges can be increased at option in order to obtain a high accuracy for the optimum end temperature. FIG. 2, again by way of example, shows how the number of ranges can be increased to four. Now an additional resistor 60 is arranged between the resistor 28 and the resistor 32, which provides two reference values with which the voltage on the node 24 can be compared when charging of the battery begins. By means of the comparator 42 and an additional comparator 62 it is now possible to distinguish between four temperature ranges. A decoder 64 converts the output signal DS of the comparator 42 and the output signal DS2 of the comparator 62 into four control signals CS1, CS2, CS3 and CS4, of which one signal is high upon the appearance of the positive-going edge of the start signal STRT. The four control signals CS1, CS2, CS3 and CS4 are applied to the control electrodes of the switching transistors 38 and 40 and two further switching transistors 66 and 68 by means of which two further resistors 70 and 72 can be connected in parallel.

After charging has started a signal rise in the output signal of one of the comparators, for example the decision signal DS from the comparator 42, will form the criterion for the selected end temperature being reached.

It will be appreciated that the manner in which the temperature of the battery is measured, the number of temperature ranges distinguished when charging of the battery begins, and the manner in which the reference value which is a measure of the selected end temperature is changed in response to the detected temperature range are not limited to the examples disclosed therein.

We claim:

1. A charging device for charging a rechargeable battery, said charging device comprising:

first means for supplying charging current to a battery, second means for terminating the supply of charging current when the battery reaches an end temperature which is higher than an initial temperature of the battery at the beginning of the supply of charging current, and third means for determining in which temperature range of a plurality of at least two given temperature ranges the initial temperature lies and for selecting the end temperature in dependence upon the determined temperature range.

2. The charging device as claimed in claim 1, wherein the third means includes fourth means for generating a temperature-dependent signal, fifth means for generating at least one reference signal to define the at least two given temperature ranges, sixth means for comparing the temperature-dependent signal with the at least one reference signal and supplying a decision signal to indicate the determined temperature range when the supply of charging current begins, and seventh means for changing the at least one reference signal in response to the decision signal after the supply of charging current has begun.

3. The charging device as claimed in claim 2, wherein the third means include a first voltage divider comprising a first resistor and a temperature-sensitive resistor, the first resistor and the temperature-sensitive resistor being interconnected in a first node, a second voltage divider comprising a second resistor and a reference resistor whose resistance value is variable in steps in response to the decision signal, the second resistor and the reference resistor being interconnected in a second node, and a comparator having inputs connected to the first and the second node and having an output for supplying the decision signal.

4. The charging device as claimed in claim 3, wherein the temperature-sensitive resistor has a negative temperature coefficient and the reference resistor comprises a parallel arrangement of a fixed resistor and two parallel resistors arranged in parallel with the fixed resistor by respective switching transistors; and eighth means for turning on one of the respective switching transistors after the beginning of the supply of charging current.

5. The charging device as claimed in claim 4, wherein the eighth means comprise: a flip-flop having a data input, said flip-flop being coupled to the output of the comparator to receive the decision signal, a clock input for receiving a start signal, two complementary outputs for supplying complementary control signals, and gate circuits for transferring the complementary control signals to the respective switching transistors under command of the start signal.

6. The charging device as claimed in claim 2, wherein the fourth means comprise a temperature-sensitive resistor thermally coupled to the battery.

7. The charging device as claimed in claim 2, wherein the fourth means comprise a strain gauge mechanically coupled to a housing of the battery, the temperature coefficient of the strain gauge differing from the temperature coefficient of the housing of the battery.

8. A rechargeable battery for use in a charging device for charging rechargeable batteries with temperature-dependent termination of the charging process, said battery comprising a housing having a temperature coefficient, a strain gauge mechanically coupled to said housing of the battery, said strain gauge having a temperature coefficient differing from the temperature coefficient of the housing of the battery.

9. The charging device as claimed in claim 3, wherein the fourth means comprise a temperature-sensitive resistor thermally coupled to the battery.

10. The charging device as claimed in claim 4, wherein the fourth means comprise a temperature-sensitive resistor thermally coupled to the battery.

11. The charging device as claimed in claim 5, wherein the fourth means comprise a temperature-sensitive resistor thermally coupled to the battery.

12. The charging device as claimed in claim 3, wherein the fourth means comprise a strain gauge mechanically coupled to a housing of the battery, the temperature coefficient of the strain gauge differing from the temperature coefficient of the housing of the battery.

13. The charging device as claimed in claim 4, wherein the fourth means comprise a strain gauge mechanically coupled to a housing of the battery, the temperature coefficient of the strain gauge differing from the temperature coefficient of the housing of the battery.

14. The charging device as claimed in claim 5, wherein the fourth means comprise a strain gauge mechanically coupled to a housing of the battery, the temperature coefficient of the strain gauge differing from the temperature coefficient of the housing of the battery.

15. A charging device for charging a rechargeable battery comprising:

a current supplier for supplying charging current to a battery having an initial temperature at the beginning of the supply of charging current, said initial temperature being in one of at least two predetermined temperature ranges; a selector for selecting an end temperature based upon the temperature range within which is said initial temperature; and a current terminator for terminating the supply of charging current when a battery reaches the end temperature, said end temperature being higher than said initial temperature.

16. The charging device as claimed in claim 15, including a generator for generating a temperature-dependent signal and generating at least one reference signal to define the at least two predetermined temperature ranges; a comparator for comparing the temperature-dependent signal with the at least one reference signal and supplying a decision signal to indicate the selected temperature range when the supply of charging current begins; and a changer for changing the at least one reference signal in response to the decision signal after the supply of charging current has begun.

17. The charging device as claimed in claim 16, and including a first voltage divider having a first resistor and a temperature-sensitive resistor, the first resistor and the temperature-sensitive being interconnected in a first node; and a second voltage divider having a second resistor and a reference resistor whose resistance value is variable in steps in response to the decision signal, the second resistor and the reference resistor being interconnected in a second node; said comparator having a first input connected to the first node and a second input connected to the second node and an output supplying the decision signal.

18. The charging device as claimed in claim 17, wherein the temperature-sensitive resistor includes a negative temperature coefficient and the reference resistor includes a parallel arrangement of a fixed resistor and two parallel resistor arranged in parallel with the fixed resistor by respective switching transistors; and including a switcher for turning on one of the respective switching transistors after the beginning of the supply of charging current.

19. The charging device as claimed in claim 16, wherein the generator includes a temperature-sensitive resistor thermal coupled to the battery.

20. The charging device as claimed in claim 16, including a strain gauge mechanically coupled to a housing of a battery, the temperature coefficient of the strain gauge differing from the temperature coefficient of the battery housing.

\* \* \* \* \*